(12) United States Patent
Ghosh et al.

(10) Patent No.: US 7,991,725 B2
(45) Date of Patent: Aug. 2, 2011

(54) INTELLIGENT REPUTATION ATTRIBUTION PLATFORM

(75) Inventors: Rishab Aiyer Ghosh, Maastricht (NL); Vipul Ved Prakash, San Francisco, CA (US)

(73) Assignee: Topsy Labs, Inc., San Francisco, CA (US)

( * ) Notice: Subject to any disclaimer, the term of this patent is extended or adjusted under 35 U.S.C. 154(b) by 0 days.

(21) Appl. No.: 12/895,593

(22) Filed: Sep. 30, 2010

(65) Prior Publication Data

US 2011/0119225 A1    May 19, 2011

Related U.S. Application Data

(63) Continuation of application No. 11/809,489, filed on Jun. 1, 2007, now Pat. No. 7,831,536.

(60) Provisional application No. 60/811,262, filed on Jun. 5, 2006.

(51) Int. Cl.
*G06F 17/00* (2006.01)
(52) U.S. Cl. ............... 706/46; 707/748; 707/756
(58) Field of Classification Search .......... 706/46; 707/748, 756
See application file for complete search history.

(56) References Cited

U.S. PATENT DOCUMENTS

| 7,512,612 | B1 * | 3/2009 | Akella et al. ................... 1/1 |
| 2005/0256866 | A1 * | 11/2005 | Lu et al. ........................ 707/5 |
| 2006/0074836 | A1 * | 4/2006 | Gardner et al. ............... 706/60 |
| 2006/0294134 | A1 * | 12/2006 | Berkhim et al. ............. 707/102 |
| 2007/0156636 | A1 * | 7/2007 | Norton et al. .................. 707/1 |
| 2007/0297405 | A1 * | 12/2007 | He ............................... 370/389 |

OTHER PUBLICATIONS

Guha, R., Kumar, R., Raghavan, P., and Tomkins, A. 2004. Propagation of trust and distrust. In Proceedings of the 13th international Conference on World Wide Web (New York, NY, USA, May 17-20, 2004). WWW'04. ACM, New York NY, pp. 403-412.*

Ziegler, C. and Lausen, G. 2005. Propagation Models for Trust and Distrust in Social Networks. Information Systems Frontiers 7, 4-5 (Dec. 2005), 337-358.*

* cited by examiner

*Primary Examiner* — Jeffrey A Gaffin
*Assistant Examiner* — David H Kim
(74) *Attorney, Agent, or Firm* — David Xue; Goodwin Procter LLP

(57) ABSTRACT

Systems and methods allowing for the attribution of reputation to data sources (e.g., for the creation of referrals) are provided. In an illustrative implementation scores (e.g., reputation scores) are determined for a target entity connected a source entity on a network on a given dimension. In the illustrative implementation, an entity may be directly linked to any number of other entities on any number of dimensions, with each link having an associated score. Illustratively, each dimension has an associated transitive dimension. A directed path on a given dimension between two entities, a source and a target, consists of a directed link from the source entity to an intermediate entity, prefixed to a directed path from the intermediate entity to the target entity. In the illustrative implementation, links on the path can travel on the transitive dimension associated with the given dimension.

2 Claims, 7 Drawing Sheets

INTELLIGENT REPUTATION ATTRIBUTION PLATFORM

CLAIM OF PRIORITY AND CROSS-REFERENCE

This application is a continuation of U.S. patent application Ser. No. 11/809,489 now U.S. Pat. No. 7,831,536 entitled INTELLIGENT REPUTATION ATTRIBUTION PLATFORM filed Jun. 1, 2007 which is incorporated herein by reference for all purposes, which claims priority to U.S. Provisional Application No. 60/811,262 entitled THE UPPER-BEYOND REPUTATION SYSTEM filed Jun. 5, 2006 which are incorporated herein by reference for all purposes.

BACKGROUND

"Knowledge is king," as the adage says, is increasingly become more germane to our exponentially expanding information-based society. Perfect knowledge is the ideal that participants seek to assist in decision making and for determining preferences, affinities, and dislikes. Practically, perfect knowledge about a given topic is virtually impossible to obtain unless the inquirer is the source of all of information about such topic (e.g., autobiographer). Armed with more information, decision makers are generally best positioned to select a choice that will lead to a desired outcome/result (e.g., which restaurant to go to for dinner). However, as more information is becoming readily available through various electronic communications modalities (e.g., the Internet), one is left to sift through what is amounting to a myriad of data to obtain relevant and, more importantly, trust worthy information to assist in decision making activities. Although there are various tools (e.g., search engines, community boards with various ratings), there lacks any indicia of personal trustworthiness (e.g., measure of the source's reputation) with located data.

Currently a person seeking to locate information to assist in a decision, to determine an affinity, and/or identify a dislike can leverage traditional non-electronic data sources (e.g., personal recommendations—which can be few and can be biased) and/or electronic data sources such as web sites, bulletin boards, blogs, etc. to locate (sometimes rated) data about a particular topic/subject (e.g., where to stay when visiting San Francisco). Such practice can be time consuming and can be unreliable as with most of the electronic data there lacks an indicia of trustworthiness of the source of the information. Failing to find a plethora (or spot on) information from immediate non-electronic and/or electronic data source, the person making the inquiry is left to make the decision using limited information which can lead to less than perfect predictions of outcomes, results, and can lead to low levels of satisfaction undertaking one or more activities for which information was sought.

Current practices also do not leverage trustworthiness of information or, stated differently, attribute a value to the reputation of the source of data (e.g., referral). With current practices, the entity seeking the data must make a value judgment on the reputation of the data source. Such value judgment is generally based on previous experiences with the data source (e.g., rely on Mike's restaurant recommendations since he is a chef and Laura's hotel recommendations in Europe since she lived and worked in Europe for 5 years). Unless the person making the inquiry has an extensive network of references from which to rely to obtain desired data needed to make a decision, most often, the person making the decision is left to take a risk or "roll the dice" based on best available non-attributed (non-reputed) data. Such prospect can lead some participants from not engaging in a contemplated activity.

From the foregoing, it is appreciated that there exists a need for systems and methods that are aimed to ameliorate the shortcomings of existing practices.

SUMMARY

System and methods are provided allowing for the attribution of reputation to data sources (e.g., for the creation of referrals). In an illustrative implementation scores (e.g., reputation scores) are determined for a target entity connected a source entity on a network on a given dimension. In the illustrative implementation, an entity may be directly linked to any number of other entities on any number of dimensions, with each link having an associated score. Illustratively, each dimension has an associated transitive dimension. A directed path on a given dimension between two entities, a source and a target, consists of a directed link from the source entity to an intermediate entity, prefixed to a directed path from the intermediate entity to the target entity. In the illustrative implementation, links on the path can travel on the transitive dimension associated with the given dimension.

In an illustrative operation, to determine a score on a given dimension between the source entity and the target entity, directed paths on the given dimension are determined through one or more available exemplary graph searches. The individual scores on each link on each path can then be combined to produce one or more resulting scores with a method or system for propagating scores and a method or system for resolving conflicts between different scores. In the illustrative operation, each intermediate entity may also be provided with a measure of influence on each dimension based on the universe of source entities for which scores for a target entity on that dimension rely on the score of a directed link from the intermediate entity on that dimension or the associated transitive dimension.

Other features of the herein described systems and methods are further described below.

BRIEF DESCRIPTION OF THE DRAWINGS

The interactive systems and methods for referral are described with reference to the accompanying drawings in which.

DETAILED DESCRIPTION

Figure 1:
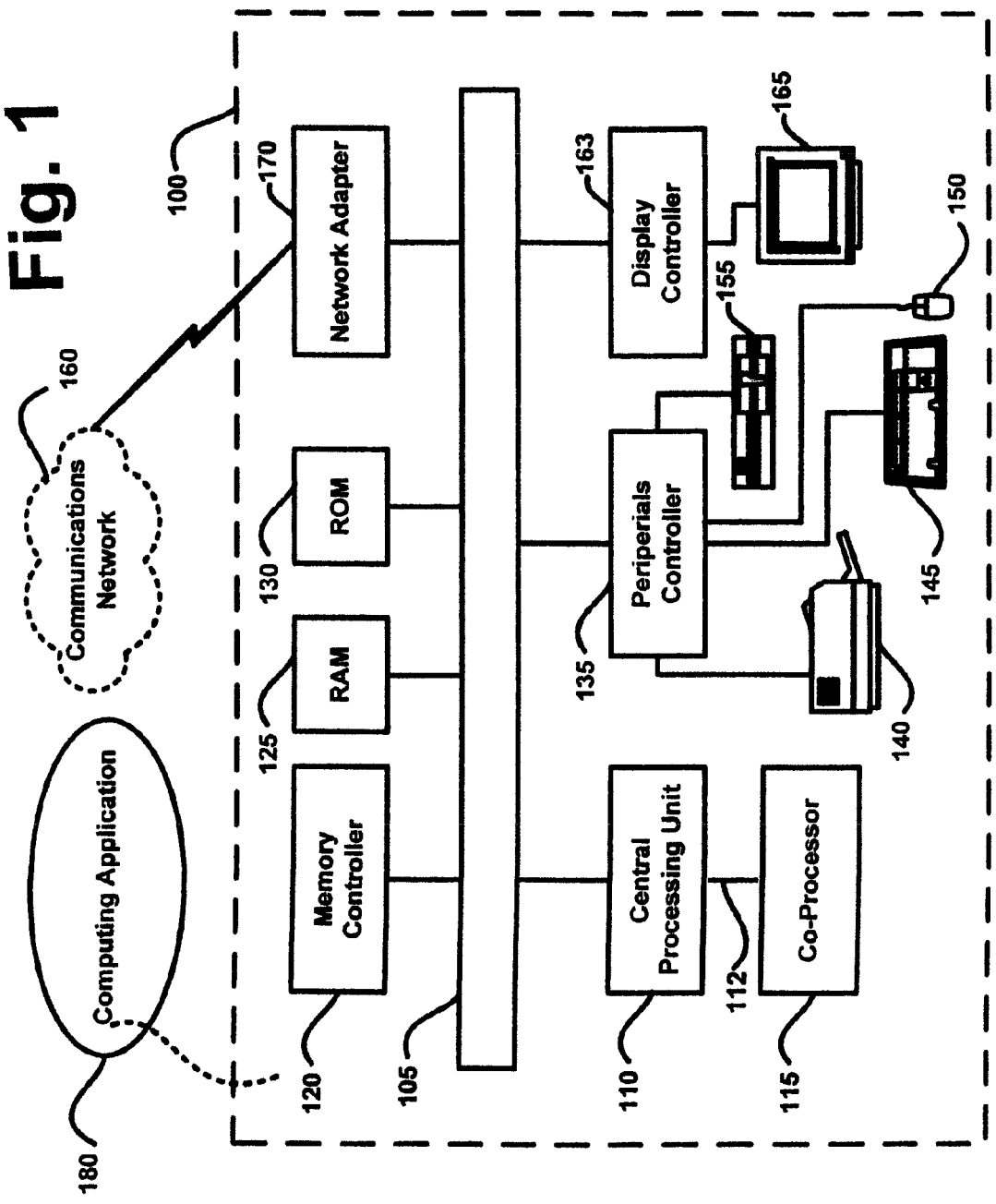
FIG. 1 is a block diagram of an exemplary computing environment in accordance with an implementation of the herein described systems and methods.

FIG. 1 depicts an exemplary computing system 100 in accordance with herein described system and methods. The computing system 100 is capable of executing a variety of computing applications 180. Computing application 180 can comprise a computing application, a computing applet, a computing program and other instruction set operative on computing system 100 to perform at least one function, operation, and/or procedure. Exemplary computing system 100 is controlled primarily by computer readable instructions, which may be in the form of software. The computer readable instructions can contain instructions for computing system 100 for storing and accessing the computer readable instructions themselves. Such software may be executed within central processing unit (CPU) 110 to cause the computing system 100 to do work. In many known computer servers, workstations and personal computers CPU 110 is implemented by micro-electronic chips CPUs called microprocessors. A coprocessor 115 is an optional processor, distinct from the main CPU 110 that performs additional functions or assists the CPU 110. The CPU 110 may be connected to co-processor 115 through interconnect 112. One common type of coprocessor is the floating-point coprocessor, also called a numeric or math coprocessor, which is designed to perform numeric calculations faster and better than the general-purpose CPU 110.

In operation, the CPU 110 fetches, decodes, and executes instructions, and transfers information to and from other resources via the computer's main data-transfer path, system bus 105. Such a system bus connects the components in the computing system 100 and defines the medium for data exchange. Memory devices coupled to the system bus 105 include random access memory (RAM) 125 and read only memory (ROM) 130. Such memories include circuitry that allows information to be stored and retrieved. The ROMs 130 generally contain stored data that cannot be modified. Data stored in the RAM 125 can be read or changed by CPU 110 or other hardware devices. Access to the RAM 125 and/or ROM 130 may be controlled by memory controller 120. The memory controller 120 may provide an address translation function that translates virtual addresses into physical addresses as instructions are executed.

In addition, the computing system 100 can contain peripherals controller 135 responsible for communicating instructions from the CPU 110 to peripherals, such as, printer 140, keyboard 145, mouse 150, and data storage drive 155. Display 165, which is controlled by a display controller 163, is used to display visual output generated by the computing system 100. Such visual output may include text, graphics, animated graphics, and video. The display controller 163 includes electronic components required to generate a video signal that is sent to display 165. Further, the computing system 100 can contain network adaptor 170 which may be used to connect the computing system 100 to an external communication network 160.

Figure 2:
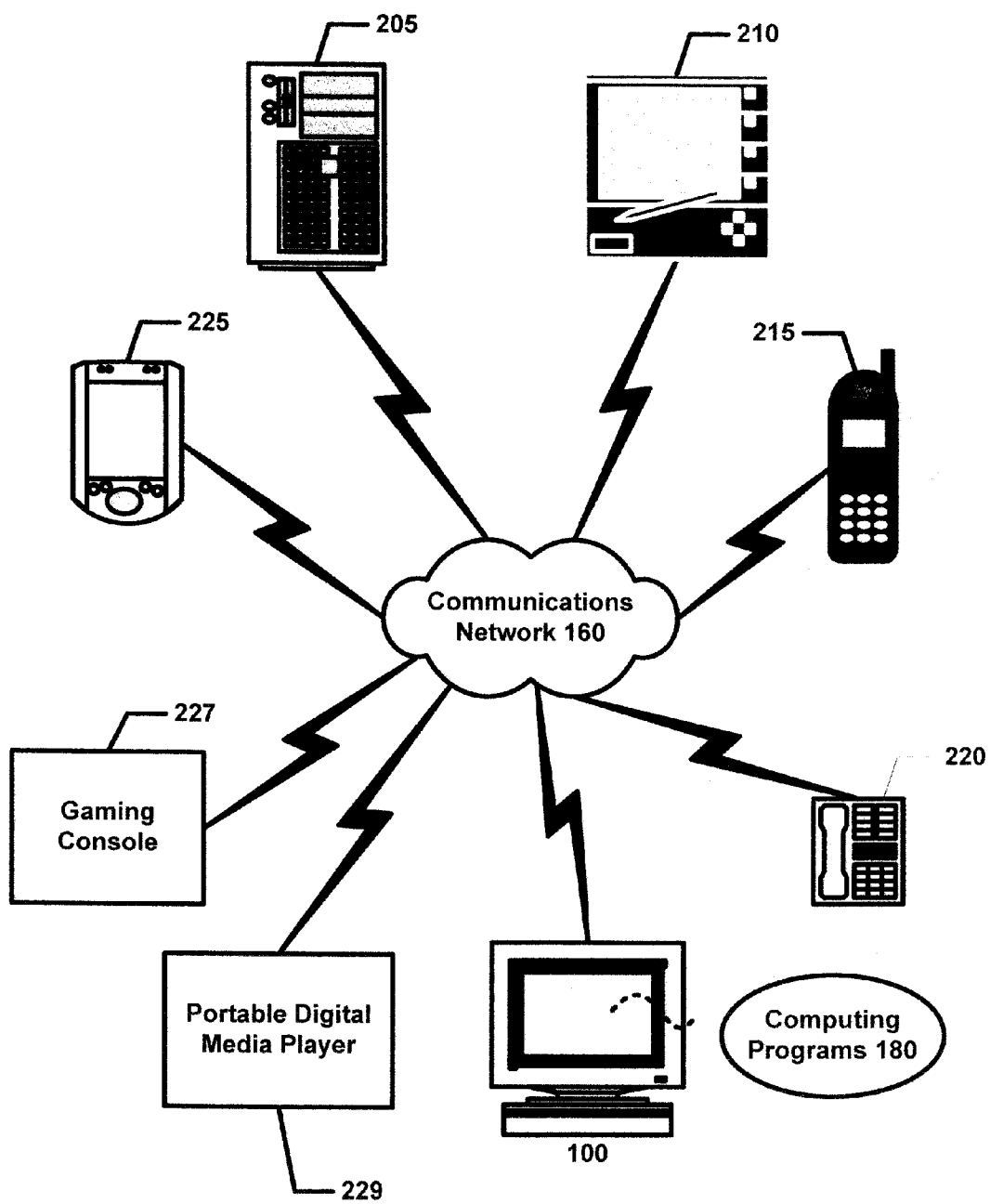
FIG. 2 is a block diagram showing the cooperation of exemplary components of an illustrative implementation in accordance with the herein described systems and methods.

Illustrative Computer Network Environment:

Computing system 100, described above, can be deployed as part of a computer network. In general, the above description for computing environments applies to both server computers and client computers deployed in a network environment. FIG. 2 illustrates an exemplary illustrative networked computing environment 200, with a server in communication with client computers via a communications network, in which the herein described apparatus and methods may be employed. As shown in FIG. 2, server 205 may be interconnected via a communications network 160 (which may be either of, or a combination of a fixed-wire or wireless LAN, WAN, intranet, extranet, peer-to-peer network, virtual private network, the Internet, or other communications network) with a number of client computing environments, which illustratively can include but are note limited to tablet personal computer 210, mobile telephone 215, telephone 220, personal computer 100, personal digital assistance 225, gaming console 227, and personal media device (e.g., IPOD®) 229. In a network environment in which the communications network 160 is the Internet, for example, server 205 can be dedicated computing environment servers operable to process and communicate data to and from client computing environments 100, 210, 215, 220, and 225 via any of a number of known protocols, such as, hypertext transfer protocol (HTTP), file transfer protocol (FTP), simple object access protocol (SOAP), or wireless application protocol (WAP). Additionally, networked computing environment 200 can utilize various data security protocols such as secured socket layer (SSL) or pretty good privacy (PGP). Each client computing environment 100, 210, 215, 220, and 225 can be equipped with operating system 180 operable to support one or more computing applications, such as a web browser (not shown), or other graphical user interface (not shown), or a mobile desktop environment (not shown) to gain access to server computing environment 205.

In operation, a user (not shown) may interact with a computing application running on a client computing environments to obtain desired data and/or computing applications. The data and/or computing applications may be stored on server computing environment 205 and communicated to cooperating users through client computing environments 100, 210, 215, 220, and 225, over exemplary communications network 160. A participating user may request access to specific data and applications housed in whole or in part on server computing environment 205. These data may be communicated between client computing environments 100, 210, 215, 220, and 220 and server computing environments for processing and storage. Server computing environment 205 may host computing applications, processes and applets for the generation, authentication, encryption, and communication data and applications and may cooperate with other server computing environments (not shown), third party service providers (not shown), network attached storage (NAS) and storage area networks (SAN) to realize application/data transactions.

Figure 3:
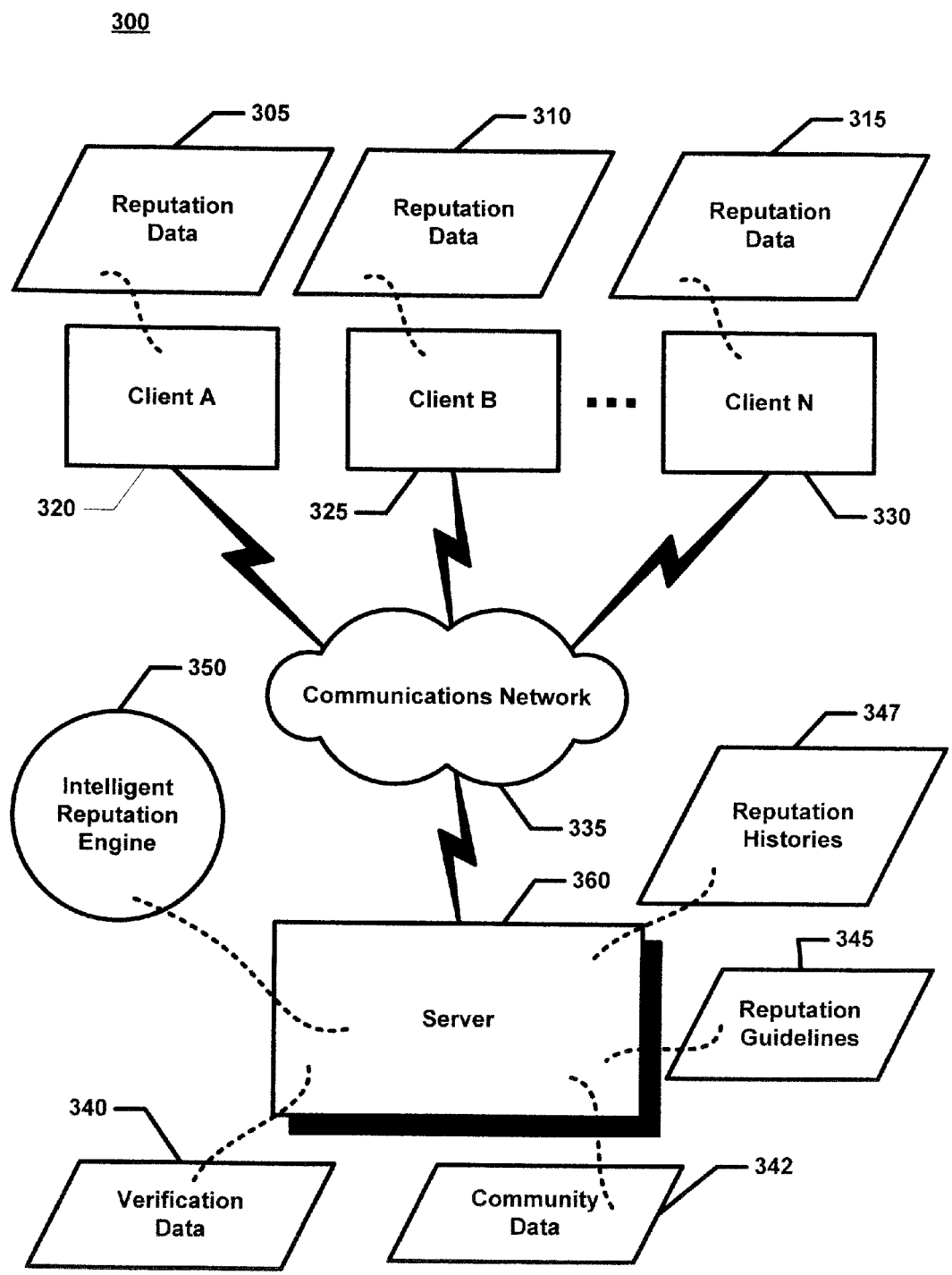
FIG. 3 is a block diagram showing the cooperation of exemplary components of another illustrative implementation in accordance with the herein described systems and methods.

Reputation Attribution:

FIG. 3 shows an illustrative implementation of exemplary reputation attribution platform 300. As is shown in FIG. 3, exemplary reputation attribution platform 300 comprises client computing environment 320, client computing environment 325 up to and including client computing environment 330, communications network 335, server computing environment 360, intelligent reputation engine 350, verification data 340, community data 342, reputation guidelines 345, and reputation histories data 347. Also, as is shown in FIG. 3, content production/sharing platform 300 can comprise a plurality of reputation data (e.g., inputted and/or generated reputation data) 305, 310, and 315 which can be displayed, viewed, stored, electronically transmitted, navigated, manipulated, stored, and printed from client computing environments 320, 325, and 330, respectively.

In an illustrative operation, client computing environments 320, 325, and 330 can communicate and cooperate with server computing environment 360 over communications network 335 to provide requests for and receive reputation data 305, 310, and 315. In the illustrative operation, intelligent reputation engine 350 can operate on server computing environment 360 to provide one or more instructions to server computing environment 360 to process requests for reputation data 305, 310, and 315 and to electronically communicate reputation data 305, 310, and 315 to the requesting client computing environment (e.g., client computing environment 320, client computing environment 325, or client computing environment 335). As part of processing requests for reputation data 305, 310, and 315, intelligent reputation engine 350 can utilize a plurality of data comprising verification date 340, community data 342, reputation guidelines 345, and/or reputation histories data 347. Also, as is shown in FIG. 3, client computing environments 320, 325, and 330 are capable of processing content production/sharing data 305, 310, and 315 for display and interaction to one or more participating users (not shown).

Figure 4:
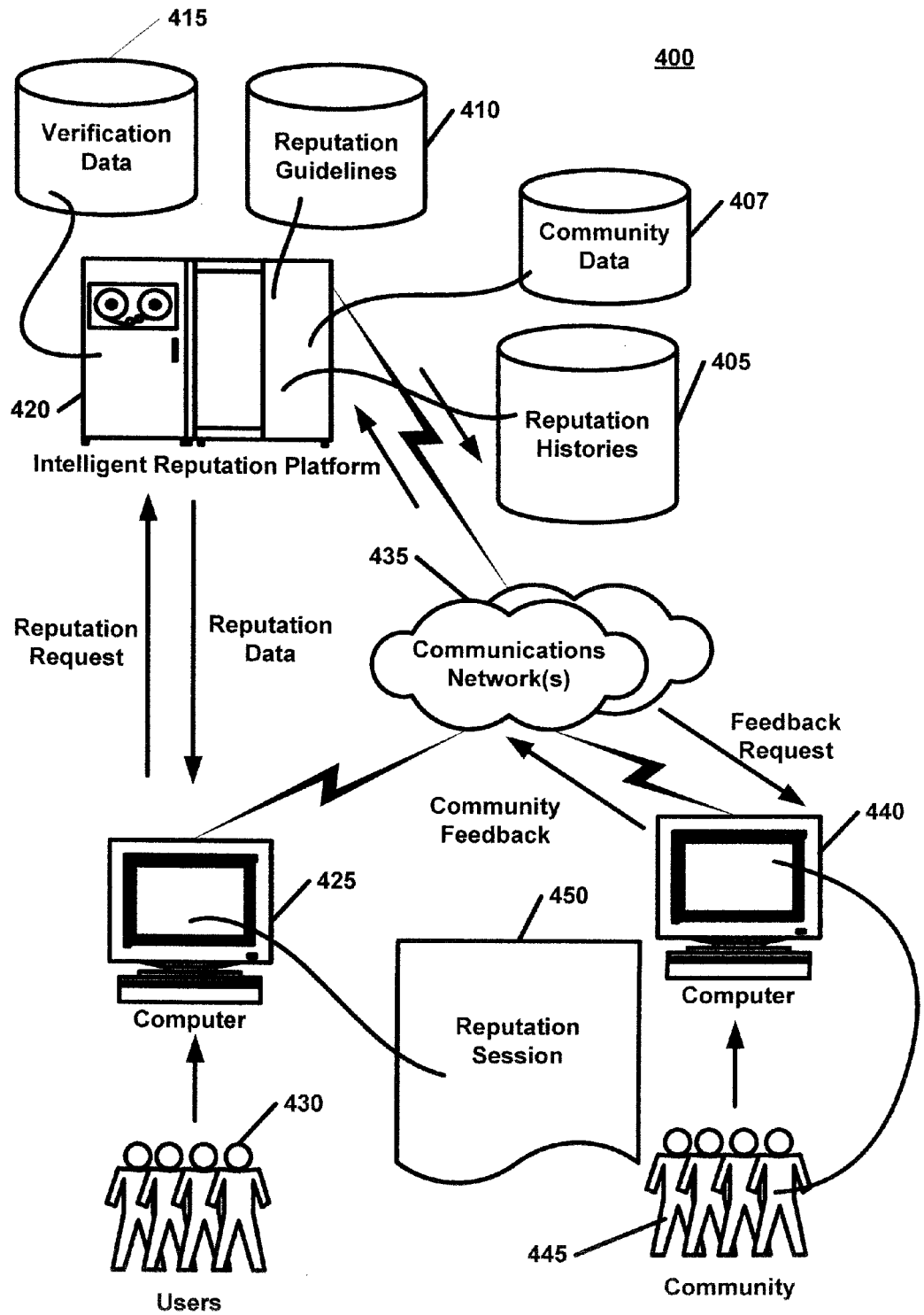
FIG. 4 is a block diagram showing an illustrative block representation of an illustrative interactive learning/assessment system in accordance with the herein described systems and methods.

FIG. 4 shows a detailed illustrative implementation of exemplary reputation attribution environment 400. As is shown in FIG. 4, exemplary content reputation attribution environment 400 comprises intelligent reputation platform 420, verification data store 415, reputation guidelines data store 410, reputation histories data store 405, and community data store 407, user computing environment 425, reputation targets (e.g., users) 430, community computing environment 440, and community 445. Additionally, as is shown in FIG. 4, reputation attribution environment 400 can comprise reputation session content 450 which can be displayed, viewed, transmitted and/or printed from user computing environment 425 and/or community computing environment 440.

In an illustrative implementation, intelligent reputation platform 420 can be electronically coupled to user computing environment 425 and community computing environment 440 via communications network 435. In the illustrative implementation, communications network can comprise fixed-wire and/or wireless intranets, extranets, and the Internet.

In an illustrative operation, users 430 can interact with a reputation data interface (not shown) operating on user computing environment 425 to provide requests to initiate a reputation session that are passed across communications network 435 to intelligent reputation platform 420. In the illustrative operation, intelligent reputation platform 420 can process requests for a reputation session and cooperate with interactive verification data store 415, reputation guidelines data store 410, reputation histories data store 405, and community data store 407 to generate a reputation session for use by users 430 and community 445.

In an illustrative implementation, verification data store 415 can comprise data representative of connections between users 430 and community members 445. Such data can include but is not limited to connections between users to identify a degree of association for use in generation of reputation data. In the illustrative implementation, reputation guideline data store 410 can comprise data representative of one or more rules for attributing reputations amongst users 330 and community 445. Reputation histories data store 405 can comprise one or more generated reputation attributions for, use as part of reputation data processing. Community data store 407 can comprise data representative of community feedback for generated reputation data.

Figure 5:
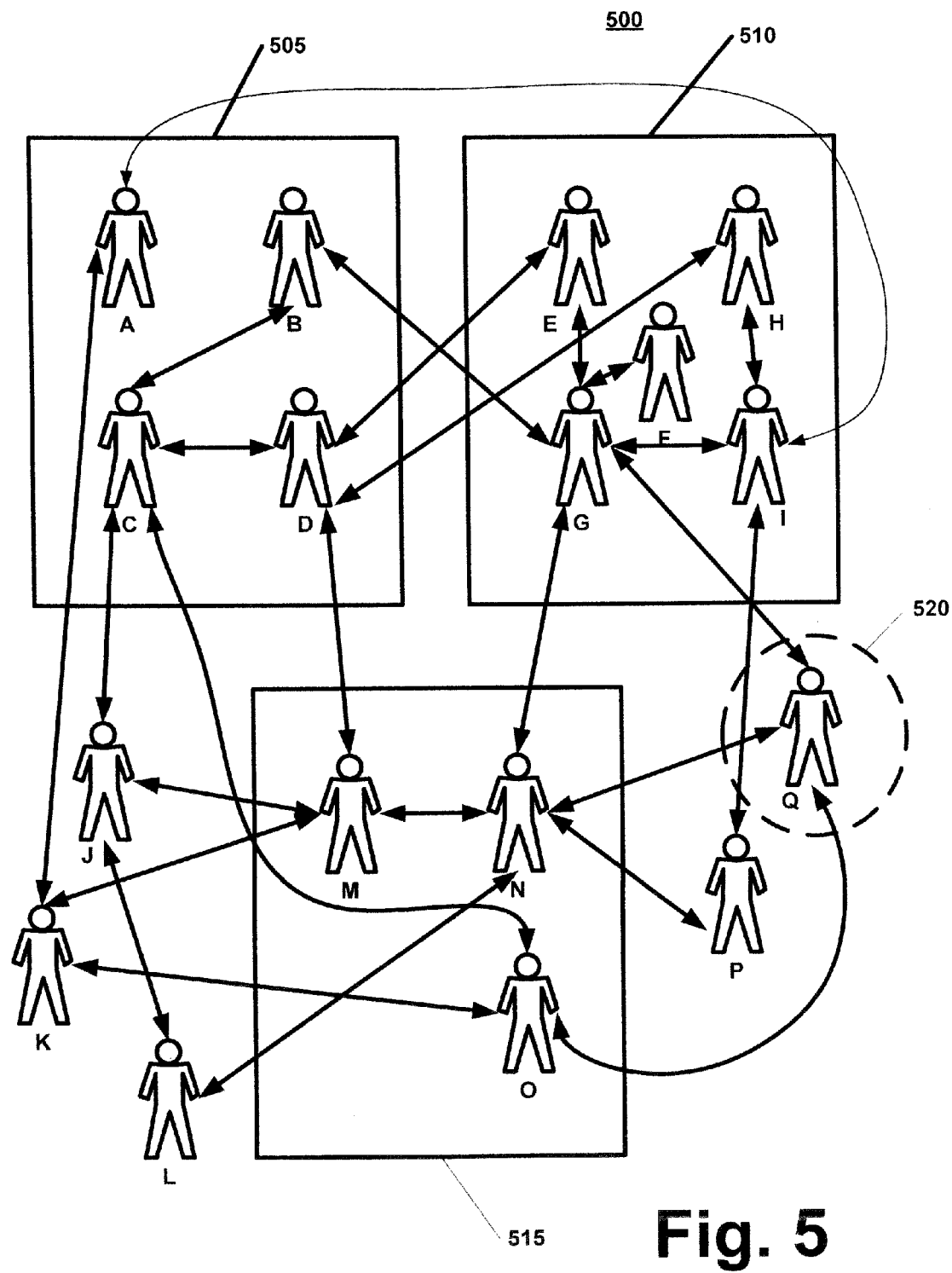
FIG. 5 is a block diagram describing the interaction of various parties of an exemplary referral environment in accordance with the herein described systems and methods.

FIG. 5 shows contributing elements of exemplary reputation attribution environment 500. As is shown, exemplary reputation attribution environment 500 comprises a plurality of sub-environments 505, 510, and 515 and numerous reputation targets A-Q. As is shown reputation targets can have direct and/or indirect connections with other reputations targets within a given sub-environment 505, 510, or 515 and/or with other reputation targets who are outside sub-environments 505, 510, 515.

In an illustrative implementation, sub-environments 505, 510, or 515 can represent one or more facets of a reputation target's experience such as work, home, school, club(s), and/or church/temple/commune. In the illustrative implementation, an exemplary reputation target Q can inquire about the reputation of other reputation targets (e.g., obtain trusted data for use to assist in making a decision, determine an affinity, and/or identify a dislike). The individual reputations of each of the target participants can be derived according to the herein described systems and methods (in FIGS. 6 and 7) so that each reputation target is attributed one or more reputation indicators (e.g., a reputation score associated for restaurant referrals, another reputation score associated for movie referrals, another reputation score associated for match-making, etc.). The reputation indicators can be calculated based on the degree and number of relationships between reputation targets in a given sub-environment and/or outside of a sub-environment. Once calculated, an exemplary reputation target Q can query other reputation targets for trusted data (i.e., recommendations and/or referrals) and can process such trusted data according to reputation score of the data source (e.g., reputation target).

For example, sub-environment 505 can represent a place of business, sub-environment 510 can represent home, and sub-environment can represent a country club. In an illustrative operation, each of the reputation targets of reputation attribution environment 500 can be attributed one or more reputation scores (e.g., reputation score for business data, reputation score for family data, etc.). In the illustrative operation, the reputation score for each reputation target for each category (e.g., business, family, social, religious, etc.) can be calculated according to the degree of relationship with other reputation targets and/or the number of connections with other relationship targets.

In the illustrative operation, reputation target Q can request data regarding a business problem (e.g., how to broker a transaction). Responsive to the request, the reputation targets of sub-environment 505 (e.g., reputation target can act as data sources for reputation target Q) providing data which can satisfy reputation target Q's request. Additionally, other reputation targets who are not directly part of sub-environment 505 but can also act as data sources to reputation target Q. In this context, the reputation score for reputation targets A, B, C, and/or D) can have a higher reputation score than other reputation targets not part of sub-environment 505 since such reputation targets are within sub-environment 505 which is focused on business. In the illustrative operation, other reputation targets not part of sub-environment 505 can have equal or near level reputation scores to reputation targets (A, B, C, and/or D) of sub-environment 505 based on the connections with reputation targets A, B, C, and/or D and reputation target Q. For example, as is shown in FIG. 5, reputation target I can have a relatively high reputation score as it pertains to business since reputation target I has a number of direct and indirect connections (I-A, I-G-B, I-H-D, I-G-E-D) to reputation targets (e.g., A, B, C, and/or D) of sub-environment 505 and to inquiring reputation target Q.

It is appreciated that although exemplary reputation attribution environment 500 of FIG. 5 is shown have a configuration of sub-environments having various participants, that such description is merely illustrative the contemplated reputation attribution environment of the herein described systems and methods can have numerous sub-environments with various participants in various non-described configurations.

Figure 6:
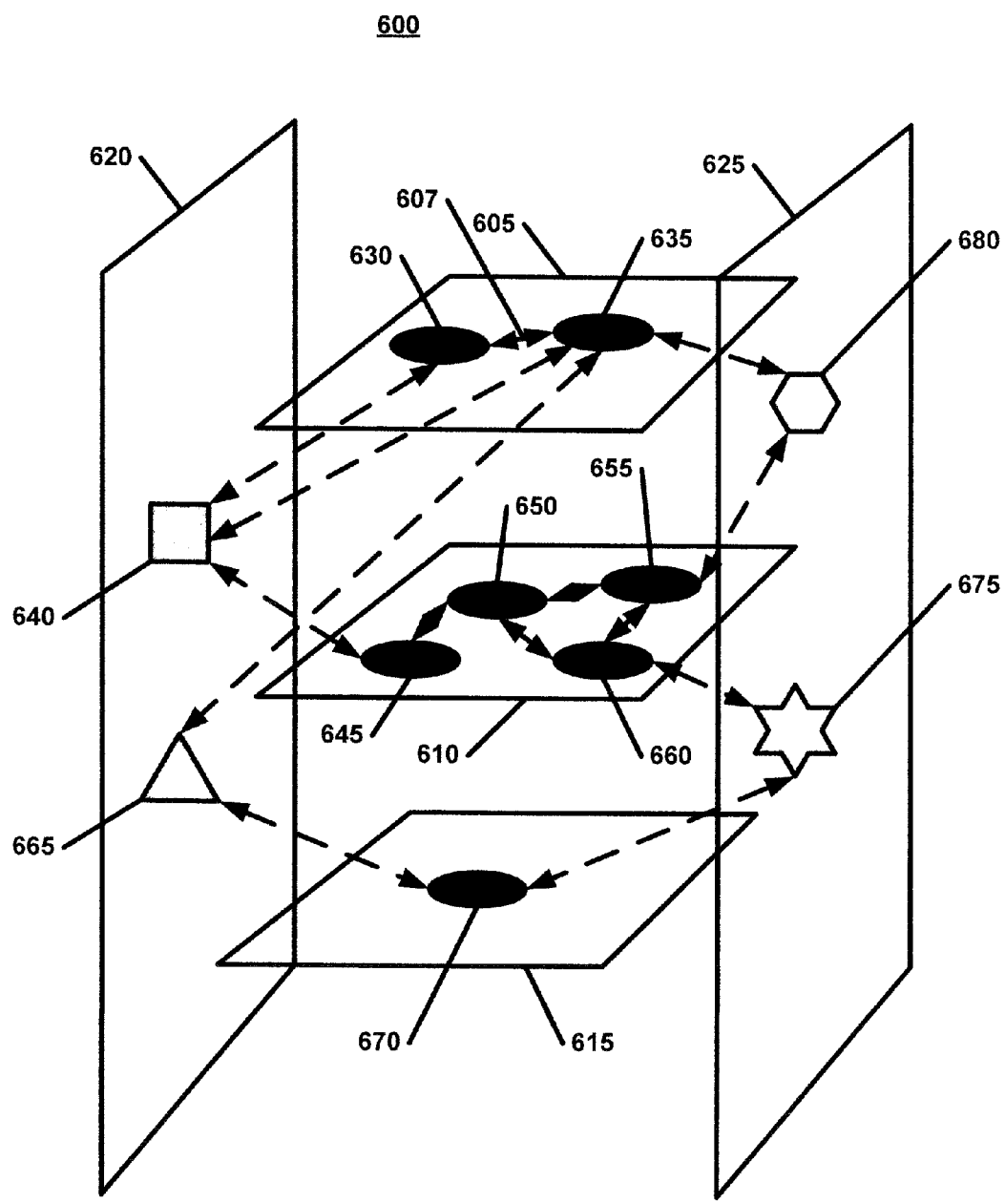
FIG. 6 is a block diagram the search space of an exemplary referral environment in accordance with the herein described systems and methods.

FIG. 6 shows exemplary reputation scoring environment 600. As is shown in FIG. 6, reputation scoring environment 600 comprises a plurality of dimensions 605, 610, and 615 which are operatively coupled to one or more transitive dimensions 620 and 625. Further, as is shown reputation scoring environment 600 comprises one or more entities 630, 635, 645, 650, 660, and 670 residing on one or more of dimensions 605, 610, and 615 as well as transitive connectors 640, 665, 670, and 680 residing on transitive dimensions 620 and 625.

In an illustrative operation, scores for one or more entities 630, 635, 645, 650, 660 and/or 670 can be determined on a network (not shown) on a given dimension 605, 610 and/or 615. In the illustrative operation, an entity 630, 635, 645, 650, 660 and/or 670 can be directly linked to any number of other entities 630, 635, 645, 650, 660 and/or 670 on any number of dimensions 605, 610, and/or 615 (i.e., such that each link— direct/indirect can be associated a score). Illustratively, one or more dimension 605, 610, and/or 615 can have an associated one or more transitive dimension 620 and/or 625.

In the illustrative operation, a directed path 607 on a given dimension 605 between two entities 630 and 635, a source and a target, consists of a directed link from the source entity 630 (i.e., illustratively 630 as all entities 630, 635, 645, 650, 660, and/or 670 can be source and/or target entities depending on the perspective of the scoring attribution platform 420 of FIG. 4) to an intermediate entity 640, prefixed to a directed path from the intermediate entity 640 to the target entity 635. In an illustrative implementation, links on the path can be on one or more transitive dimensions 620 and/or 625 associated with a given dimension 605, 610, and/or 615. Illustratively, to determine a score on a given dimension 605, 610, and/or 615 between a source entity 630 and a target entity 635, directed paths 607 on the given dimension 605, 610, and/or 615 are determined through any kind of graph search (not shown). In the illustrative operation, the individual scores on the one or more links on the one or more paths can be combined to produce one or more resulting scores with a one or more available methods (and/or systems) for propagating scores and generally available methods or systems for resolving conflicts between different scores. Illustratively, one or more intermediate entities 640, 665, 670, and/or 680 can also be provided with a measure of influence on the dimensions 605, 610 and/or 615 based on the universe of source entities (e.g., 630, 635, 645, 650, 660, and/or 670) for which scores for a target entity (630, 635, 645, 650, 660, and/or 670) on that dimension 605, 610, and/or 615 rely on the score of a directed link 607 from the intermediate entity 640, 665, 670, and/or 680 on that dimension 605, 610, and/or 615 or the associated transitive dimension 620 and/or 625.

It is appreciated that although reputation scoring environment 600 is shown to have a particular configuration operating to an illustrative operation with a particular number of dimensions, transitive dimensions, entities, direct connections and indirect connections that such description is merely illustrative as the reputations scoring of the herein described systems and methods can employ various dimensions, transitive dimensions, entities, direct, and/or indirect connections having various configurations and assemblages operating according to other illustrative operations.

Figure 7:
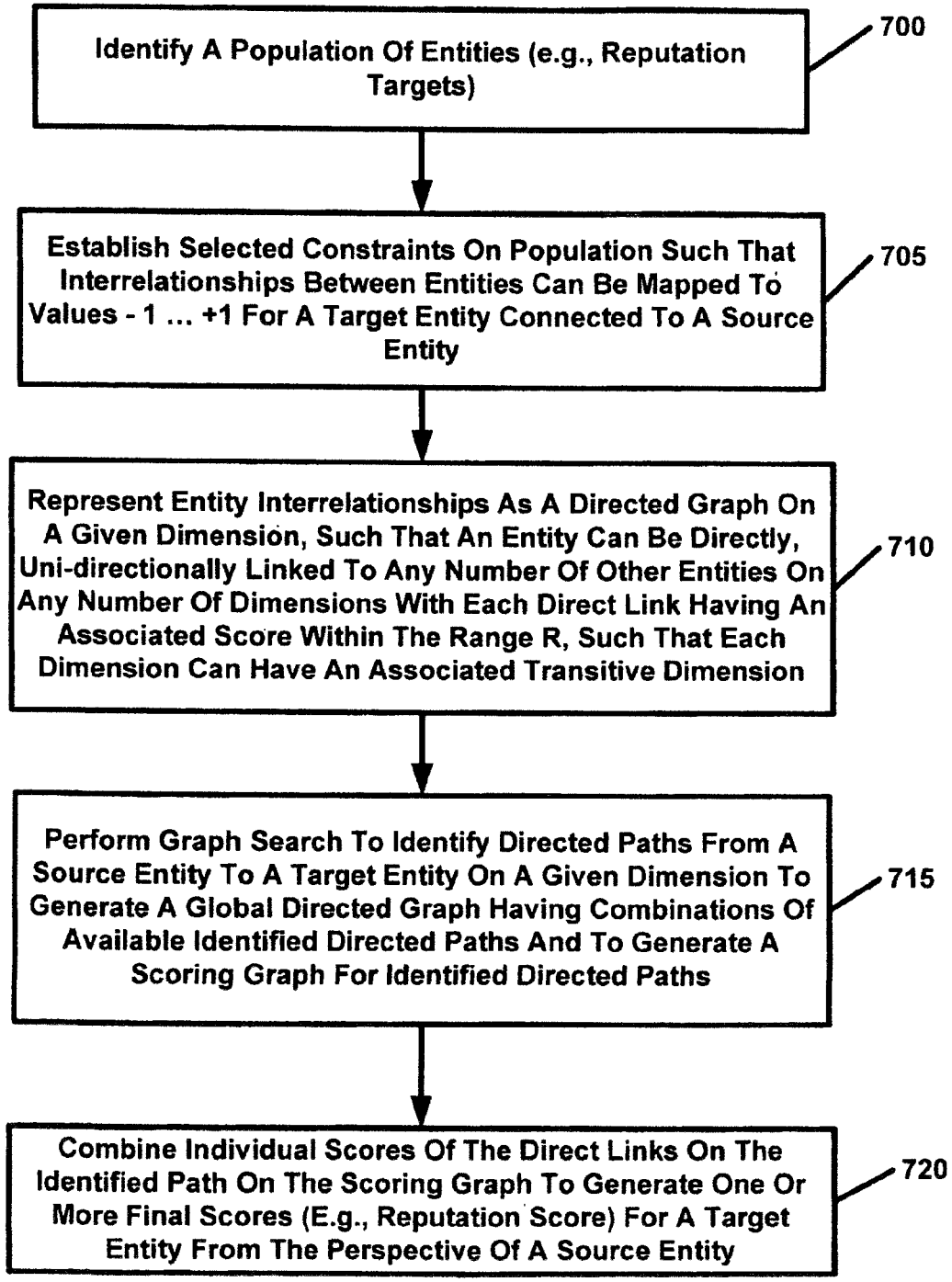
FIG. 7 is a flow diagram showing illustrative processing performed in generating referrals in accordance with the herein described systems and methods.

FIG. 7 shows exemplary processing in calculating reputations scores. As is shown in FIG. 7, processing begins at block 700 where a population of entities are identified. From there processing proceeds to block 705 where selected constraints are established on the identified population such that the interrelationships between the entities can be mapped to values −1 to +1 for a target entity connected to source entity. Processing then proceeds to block 710 where entity relationships are represented as directed graph on a given dimension such that an entity can be directly, uni-directionally linked to any number of other entities on any number of dimensions with each direct link having an associated score within a selected range R such that each dimension can have therewith an associated transitive dimension. From there, processing proceeds to block 715 where a graph search is performed to identify directed paths from a source entity to a target entity on a given dimension to generate a global directed graph having combinations of available identified directed paths and to generate a scoring graph for identified directed paths. Processing then proceeds to block 720 where individual scores of the direct links on an identified path can be combined to generate one or more final scores (e.g., reputation score) for a target entity from the perspective of a source entity.

In an illustrative implementation, the processing of FIG. 7 can be performed such that for a population of entities, a method of determining scores, each within the range R which can be mapped to the values −1 . . . +1, for a target entity connected to a source entity on a network that may be conceptually represented as a directed graph on each given dimension, such that an entity may be directly, uni-directionally linked to any number of other entities on any number of dimensions, with each direct link having an associated score within the range R. Further, each dimension can have an associated transitive dimension and such that a directed path on a given dimension between two entities, a source entity and a target entity, can be defined as a direct link from the source entity to an intermediate entity, prefixed to a directed path from the intermediate entity to the target entity, subject to the selected constraints including but not limited to: 1) a direct link from any entity to the target entity must be on the given dimension, and 2) a direct link on the path from any entity to an intermediate entity that is not the target entity must be either on the transitive dimension associated with the given dimension, or on the given dimension itself if the given dimension is itself is a transitive dimension.

Furthermore in the illustrative operation, the processing of FIG. 7 can include but is not limited to: (A) performing a graph search (i.e., from generally available graph search techniques) to identify directed paths from a source entity to a target entity on a given dimension subject to the above definition of a directed path which optimally results in a directed graph combining all such identified directed paths. The resulting directed graph can be defined as a scoring graph that may be stored separately. In the illustrative operation, individual scores can be combined (B) on each direct link on each path on the scoring graph to produce one or more final scores, with or without an associated set of confidence values in the range C=0 . . . 1 for each resulting score, for the target entity from the perspective of the source entity. In the illustrative operation, the acts (A) and (B) may be performed in sequence, or performed simultaneously; when performed simultaneously, the combination of individual scores described in act (B) being performed during the graph search described in act (A) without the creation of separately stored scoring graph; and wherein the graph search performed in act (A) may be optimized by some combination of scores identified through act (B) such that the optimization may result in the exclusion of certain paths between the source entity and the target entity.

It is understood that the herein described systems and methods are susceptible to various modifications and alternative constructions. There is no intention to limit the herein described systems and methods to the specific constructions described herein. On the contrary, the herein described systems and methods are intended to cover all modifications, alternative constructions, and equivalents falling within the scope and spirit of the herein described systems and methods.

It should also be noted that the herein described systems and methods can be implemented in a variety of electronic environments (including both non-wireless and wireless computer environments, including cell phones and video phones), partial computing environments, and real world environments. The various techniques described herein may be implemented in hardware or software, or a combination of both. Preferably, the techniques are implemented in computing environments maintaining programmable computers that include a computer network, processor, servers, a storage medium readable by the processor (including volatile and non-volatile memory and/or storage elements), at least one input device, and at least one output device. Computing hardware logic cooperating with various instructions sets are applied to data to perform the functions described above and to generate output information. The output information is applied to one or more output devices. Programs used by the exemplary computing hardware may be preferably implemented in various programming languages, including high level procedural or object oriented programming language to communicate with a computer system. Illustratively the herein described apparatus and methods may be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The apparatus may also be considered to be implemented as a computer-readable storage medium, configured with a computer program, where the storage medium so configured causes a computer to operate in a specific and predefined manner.

Although exemplary implementations of the herein described systems and methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods. The herein described systems and methods may be better defined by the following exemplary claims.

What is claimed is:

1. A method to determine an influence in a dimension of an intermediate entity in determining a score in the dimension of a target entity from a source entity, comprising:
   (a) determining using a processor a measure of influence of the intermediate entity on potential source entities, wherein the potential source entities include those with one or more directed paths to the intermediate entity on the dimension or an associated transitive dimension, wherein potential target entities include those to which one or more directed paths exist from the intermediate entity on the dimension or the associated transitive dimension, wherein the measure of influence is calculated as a function of values including a number of potential source entities, a number of potential target entities, a number of potential directed paths between any given entity and any other entity on the dimension, the number of potential directed paths that include the intermediate entity, a number of times within a defined period that a directed link from the intermediate entity is used for the target entity, combining individual scores on a direct link on one or more directed paths on a scoring directed graph to produce one or more final scores, a number of times within a defined period that a path from any source entity to any target entity is identified by performing a graph search to identify one or more directed paths from the source entity to the target entity on the dimension to generate a directed graph having therein a combination of identified directed paths, and a number of times within a defined period that a set of final scores is generated for the target entity, combining individual scores on a direct link on one or more directed paths on a scoring directed graph to generate one or more final scores.

2. The method as recited in claim 1, further comprising:
   notifying entities comprising any of the source entities, the target entities, and the intermediate entity of the measure of influence determined for the intermediate entity.

* * * * *